United States Patent
Takizawa

[19]

[11] Patent Number: 6,120,711
[45] Date of Patent: Sep. 19, 2000

[54] ACCUMULATOR CONTROL METHOD FOR AN INJECTION MOLDING MACHINE

[75] Inventor: Michiaki Takizawa, Nagano, Japan

[73] Assignee: Nissei Plastic Industrial Co., Ltd., Nagano-ken, Japan

[21] Appl. No.: 09/048,339

[22] Filed: Mar. 26, 1998

[30] Foreign Application Priority Data

Mar. 28, 1997 [JP] Japan ..................................... 9-078529

[51] Int. Cl.$^7$ ................................................. B29C 45/82
[52] U.S. Cl. ..................... 264/40.1; 264/40.5; 264/328.1; 425/135
[58] Field of Search .................................. 264/40.1, 40.5, 264/328.1; 425/135, 145, 149, 150

[56] References Cited

U.S. PATENT DOCUMENTS 4,712,991 12/1987 Hehl ........................................ 425/145
5,052,909 10/1991 Hertzer et al. .......................... 425/150

FOREIGN PATENT DOCUMENTS 5-50483  3/1993  Japan .

Primary Examiner—Jill L. Heitbrink
Attorney, Agent, or Firm—Birch, Stewart, Kolasch & Birch, LLP

[57] ABSTRACT

In a method of controlling an accumulator connected to an oil hydraulic circuit of an injection molding machine, a charge start point and a charge end point for the accumulator are set for each of molding cycles or for each of step divisions constituting a single molding cycle. During molding, control is performed such that the charge start point and the charge end point are synchronized with each molding cycle. Thus, pressures in the respective steps of each molding cycle become constant (stable) among molding cycles.

6 Claims, 6 Drawing Sheets

6,120,711

ACCUMULATOR CONTROL METHOD FOR AN INJECTION MOLDING MACHINE

BACKGROUND OF THE INVENTION

1. Field of the Invention

The present invention relates to an accumulator control method for controlling an accumulator connected to the oil hydraulic circuit of an injection molding machine.

2. Description of the Relevant Art:

In a conventional method for controlling an accumulator connected to the oil hydraulic circuit of an injection molding machine as disclosed in Japanese Patent Application Laid-Open (kokai) No. 5 (1993)-50483, the charge pressure of an accumulator is sensed by means of a pressure switch; when the charge pressure Pc of the accumulator reaches a lower limit Ld, a control valve is operated so as to charge the accumulator with hydraulic oil as shown in FIG. 6; and when the charge pressure Pc of the accumulator reaches an upper limit value Lu, the control valve is operated so as to terminate charging. Thus, the accumulator is always charged with hydraulic oil at a predetermined pressure or higher.

However, the above conventional method of controlling an accumulator involves the following problems.

First, since the accumulator is charged based on the charge pressure Pc sensed by the pressure switch, charge start points Sa, Sb, Sc, Sd, . . . and charge end points Ea, Eb, Ec, . . . appear at irregular intervals in corresponding molding cycles, as shown in FIG. 6. Accordingly, the charge pressures Pc in the respective steps of each molding cycle vary among molding cycles. As a result, molding cannot be performed stably with a high degree of reproducibility, and molding quality is impaired and variable.

Second, since the accumulator is charged through control that is performed based on a predetermined upper limit Lu of pressure and a predetermined lower limit Ld of pressure, the accumulator is often wastefully charged, resulting in an impairment of energy economy and economical efficiency.

SUMMARY OF THE INVENTION

An object of the present invention is to provide an accumulator control method for an injection molding machine capable of making charge pressures in the respective steps of each molding cycle constant (stable) among molding cycles to thereby improve the quality and homogeneity of molded products.

Another object of the present invention is to provide an accumulator control method for an injection molding machine capable of preventing wasteful accumulation of energy to thereby improve energy economy and economical efficiency.

To achieve the objects, the present invention provides a method of controlling an accumulator for an injection molding machine, comprising the steps of: setting a charge start point and a charge end point for the accumulator for each of molding cycles or for each of step divisions constituting a single molding cycle: and performing control during molding such that the charge start point and the charge end point are synchronized with each molding cycle.

DETAILED DESCRIPTION OF THE PREFERRED EMBODIMENT

An embodiment of the present invention will now be described in detail with reference to the drawings. The accompanying drawings are illustrative of the embodiment and are not meant to limit the scope of the invention. To clarify the invention, the detailed description of known parts is omitted.

Figure 5:
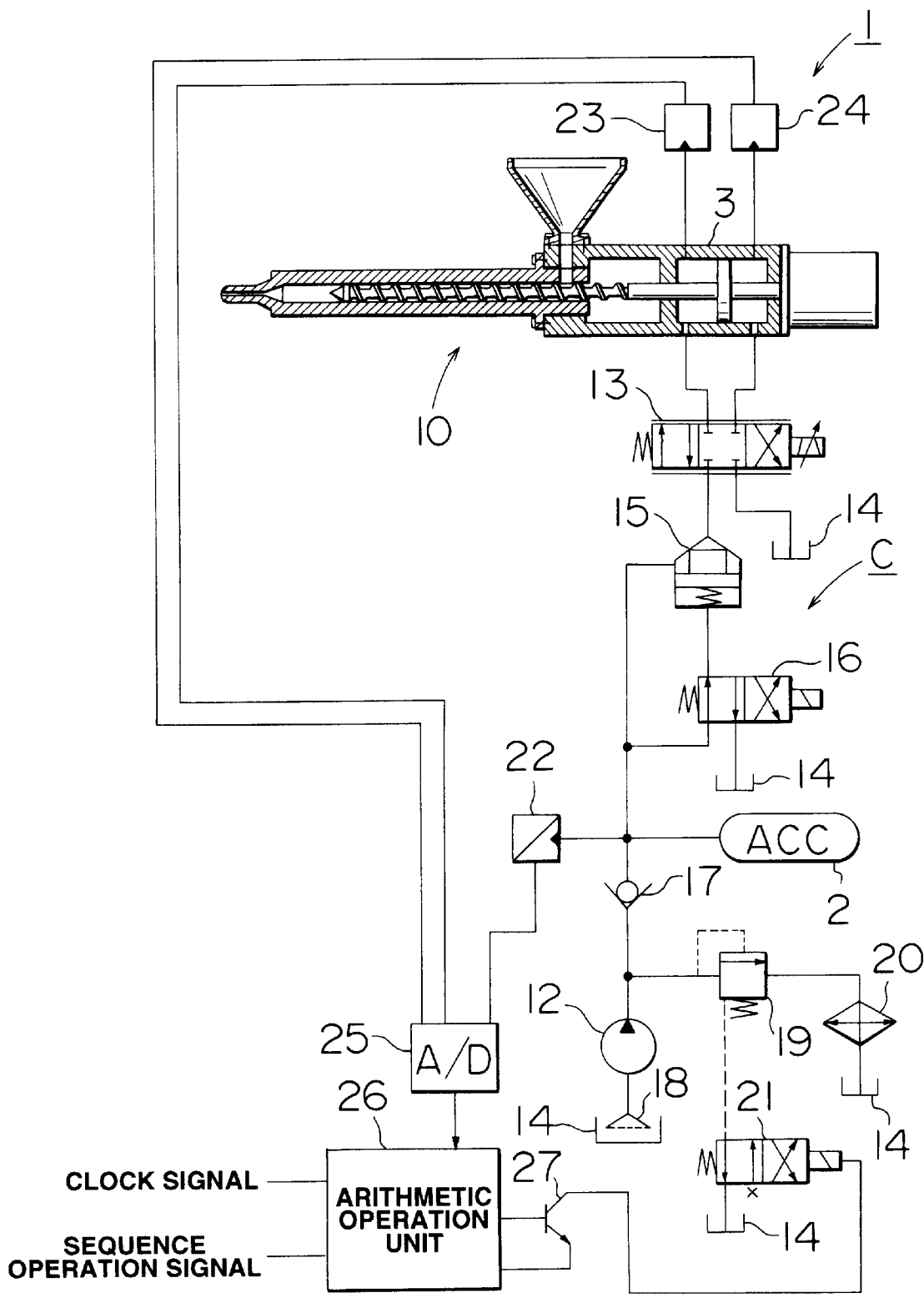
FIG. 5 is a diagram showing an oil hydraulic circuit including a schematic structure of an injection apparatus in an injection molding machine in which the accumulator control method can be embodied.
Figure 6:
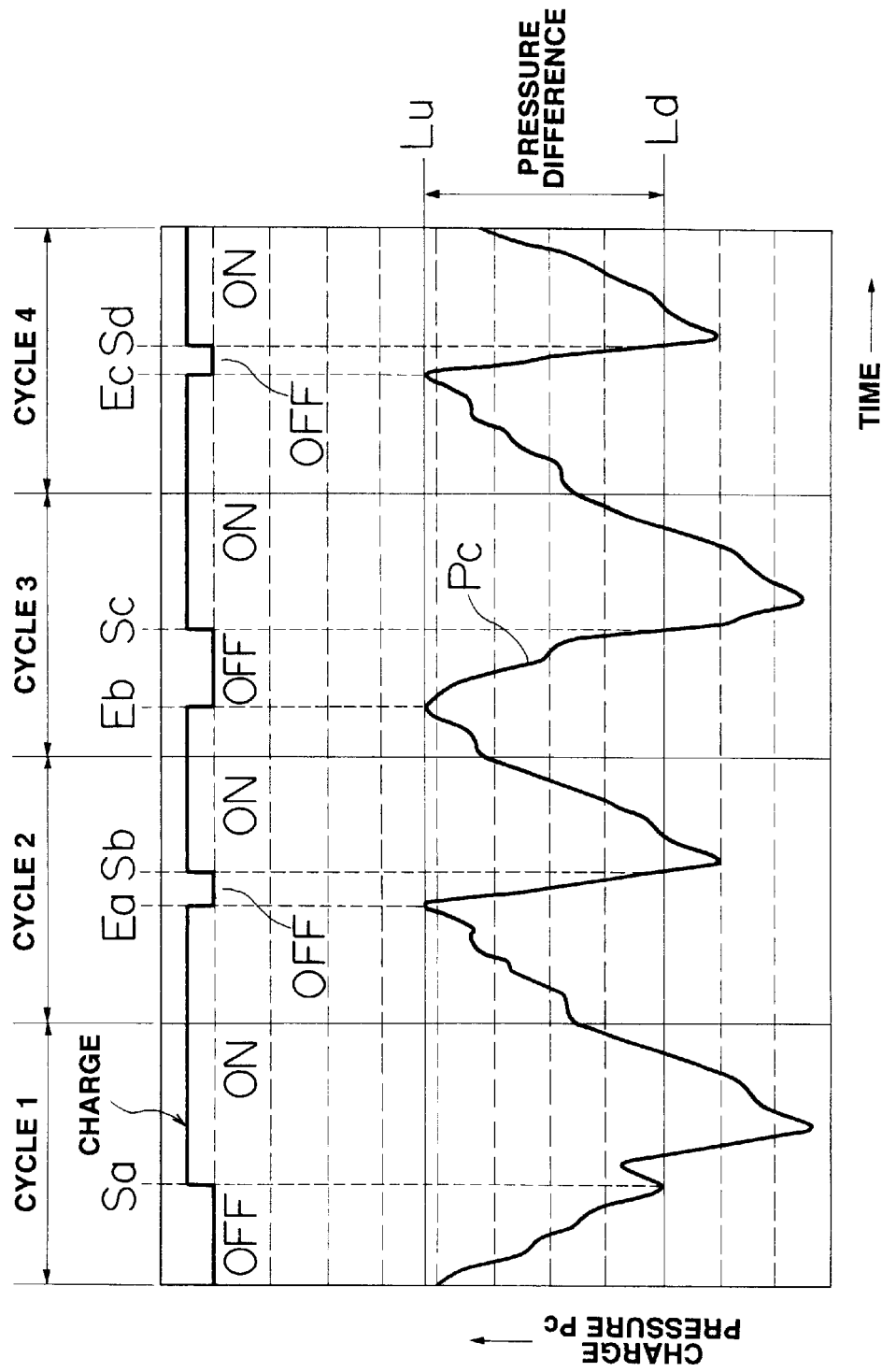
FIG. 6 is a characteristic diagram showing charge timing in molding cycles in the case of performing control in accordance with a conventional accumulator control method.

First described, with reference to FIG. 5, is the structure of an injection molding machine 1 in which an accumulator control method according to the present embodiment can be embodied. In the injection molding machine 1, reference numeral 10 denotes an injection apparatus. The injection apparatus 10 includes an injection cylinder (actuator) 3, which is connected to an oil hydraulic circuit C. In the oil hydraulic circuit C, reference numeral 12 denotes an oil hydraulic pump, numeral 13 denotes a 4-port servo valve, numeral 14 denotes an oil tank, numeral 15 denotes a logic valve, numeral 16 denotes a directional control valve, numeral 17 denotes a check valve, and numeral 18 denotes a filter. An accumulator (ACC) 2 is connected to the oil supply path on the downstream side of the check valve 17. The oil tank 14 is connected to the oil supply path, via a relief valve 19 and a cooler 20, on the discharge side of the oil hydraulic pump 12 and on the upstream side of the check valve 17. The pilot port of the relief valve 19 is connected to the oil tank 14 via a control valve (load changeover valve) 21.

Reference numeral 22 denotes a pressure sensor for sensing the charge pressure of the accumulator 2, and numerals 23 and 24 denote pressure sensors for sensing the front oil chamber pressure and the rear oil chamber pressure, respectively, of the injection cylinder 3. The pressure sensors 22, 23, and 24 are connected to an arithmetic operation unit 26 via an analog-to-digital converter circuit 25. A clock signal and a sequence operation signal (molding step signal) are input to the arithmetic operation unit 26. An output signal (load signal) from the arithmetic operation unit 26 is supplied to the control valve 21 via an output transistor 27.

Next, the method of controlling an accumulator according to the present embodiment will be described with reference to FIGS. 1 to 4.

Figure 3:
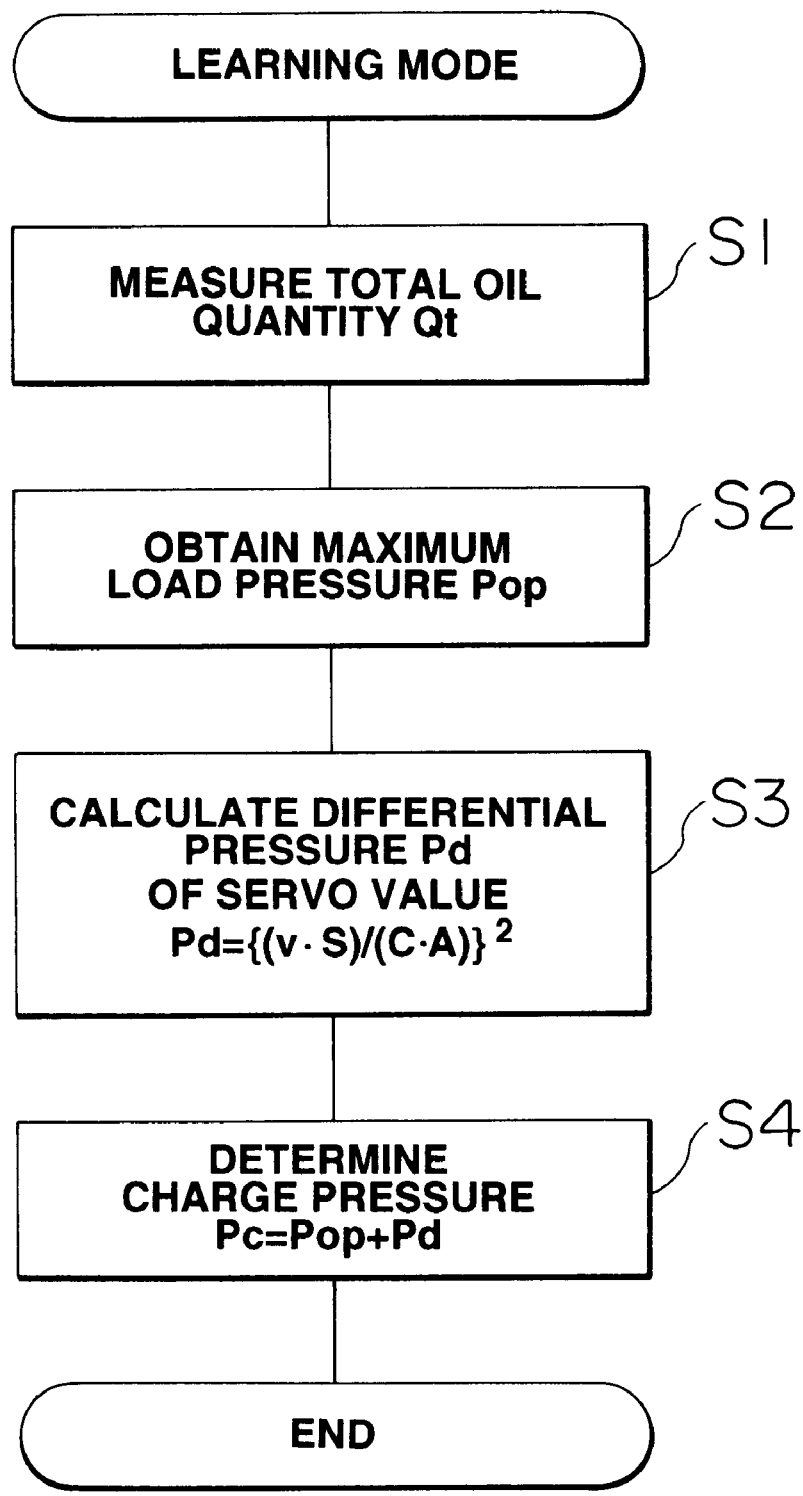
FIG. 3 is a flowchart showing a processing procedure in a learning mode used in the accumulator control method.
Figure 4:
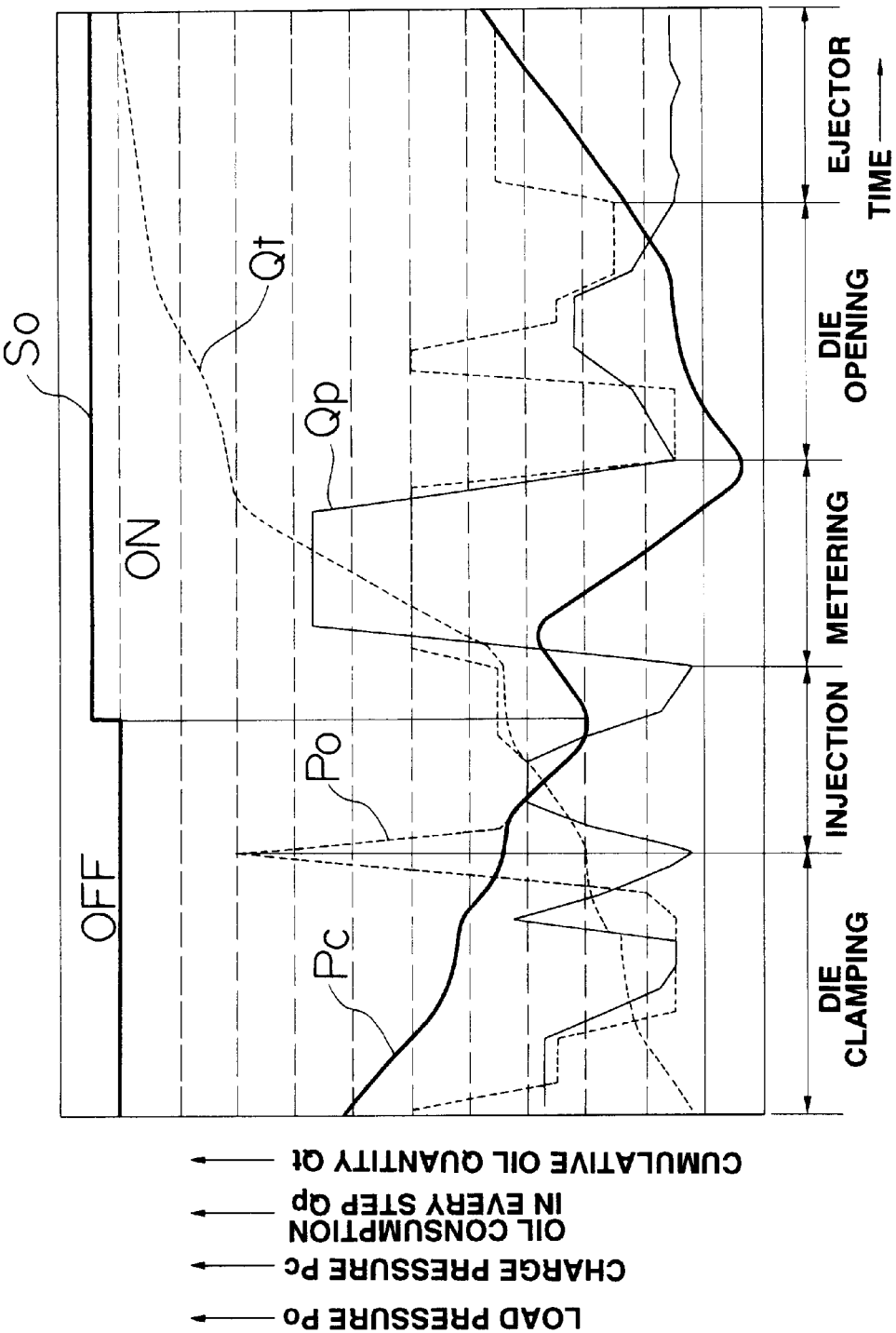
FIG. 4 is a characteristic diagram showing charge timing and physical quantities in a single molding cycle as measured in the learning mode used in the accumulator control method.

First, required physical quantities are measured and calculated in accordance with the procedure as illustrated by the flowchart (learning mode) of FIG. 3. The injection molding machine 1 is operated in an automatic mode so as to control the accumulator 2 by a conventional method. Specifically, when the pressure of the accumulator 2 reaches a predetermined lower limit, charging the accumulator 2 is started. When the pressure of the accumulator 2 reaches a predetermined upper limit, charging the accumulator 2 is ended. In this case, since a pressure sensed by the pressure sensor 22 is sent to the arithmetic operation unit 26 (see FIG. 5), the arithmetic operation unit 26 supplies a predetermined output signal (load signal) So to the control valve 21 so as to control timing for the start of charging (loading) or for the termination of charging (unloading). In FIG. 4, symbol So denotes an output signal from the arithmetic operation unit 26.

Then, a cumulative oil quantity Qt required for performing a single cycle of molding is measured (step S1) through utilization of a differential pressure scheme. In FIG. 4, symbol Qt denotes a cumulative oil quantity required for performing a single cycle of molding, and symbol Qp denotes an oil consumption in every step of molding. Also, the charge pressure Pc of the accumulator 2 is measured at the beginning and at the end of every step of molding (die clamping step, injection step, metering step, die opening step, and ejector step). In FIG. 4, symbol Pc denotes the charge pressure for the accumulator 2.

Further, a maximum load pressure Pop is obtained from among load pressures during a single cycle of molding (or during every step of molding) (step S2). In FIG. 4, symbol Po denotes a load pressure. The load pressure Po is sensed by the pressure sensors 23 and 24.

When Q represents a flow rate, v represents the piston speed (set value) of the injection cylinder 3 indicative of an injection speed, S represents the piston area of the injection cylinder 3, C represents a flow coefficient, A represents the opening area of the servo valve 4, and Pd represents the differential pressure of the servo valve 4, the relationship "$Q = v \cdot S = C \cdot A \cdot \sqrt{Pd}$" holds. Accordingly, the arithmetic operation unit 26 calculates the differential pressure Pd of the servo valve 4 from "$Pd = \{(v \cdot S)/(C \cdot A)\}^2$" (step S3). Then, the thus-calculated differential pressure Pd is added to the maximum load pressure Pop obtained above in step S2 to thereby determine the charge pressure Pc (step S4). Also, a required oil quantity for the injection cylinder 3 can be calculated from the effective discharge of the oil hydraulic pump 12 which is calculated from the load time of the oil hydraulic pump 12.

Based on the above result of calculation in the learning mode, a charge start point Si and a charge end point Ei for the accumulator 2 are set. In this case, the charge start point Si and the charge end point Ei can be set for each of molding cycles or for each of step divisions constituting a single molding cycle. When the charge start point Si and the charge end point Ei are set for each of molding cycles, a single molding cycle contains a single charge start point Si and a single charge end point Ei. When the charge start point Si and the charge end point Ei are set for each of step divisions constituting a single molding cycle, a single molding cycle contains a plurality of charge start points Si and a plurality of charge end points Ei. The present embodiment exemplifies the case of setting the charge start point Si and the charge end point Ei for each of molding cycles.

First, the charge end point Ei is set. The charge end point Ei is set at a point of time before the maximum load pressure Pop occurs. Specifically, in FIG. 2, the charge end point Ei is set at a point of time before the metering step. The charge start point Si is determined based on the charge characteristic of the accumulator 2 and the total oil quantity Qt required for a single molding cycle starting from the charge end point Ei and is set accordingly. The present embodiment exemplifies the case of setting the charge start point Si at a certain point of time within the die opening step.

Figure 1:
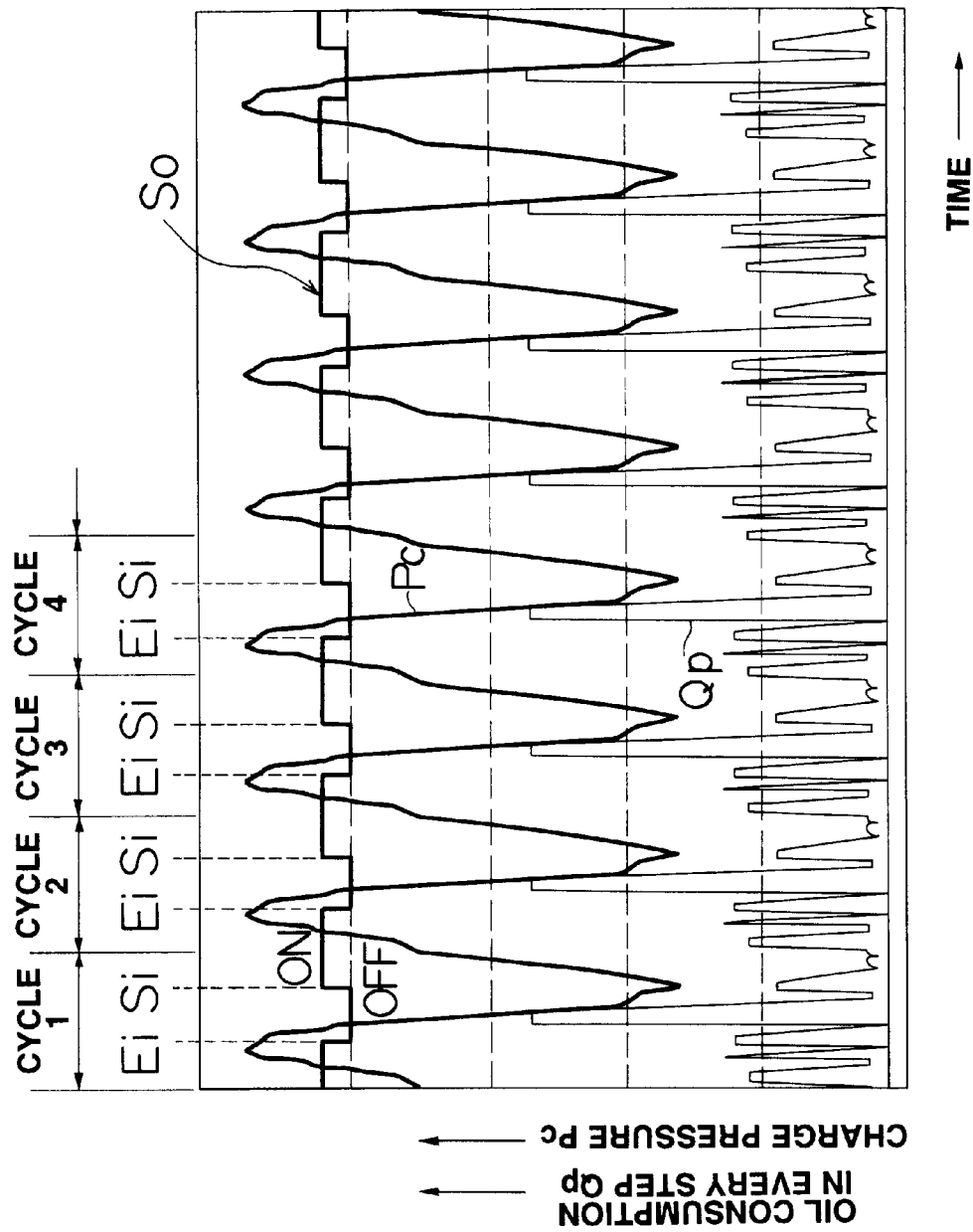
FIG. 1 is a characteristic diagram showing charge timing and physical quantities in molding cycles in the case of performing control in accordance with an accumulator control method according to an embodiment of the present invention.
Figure 2:
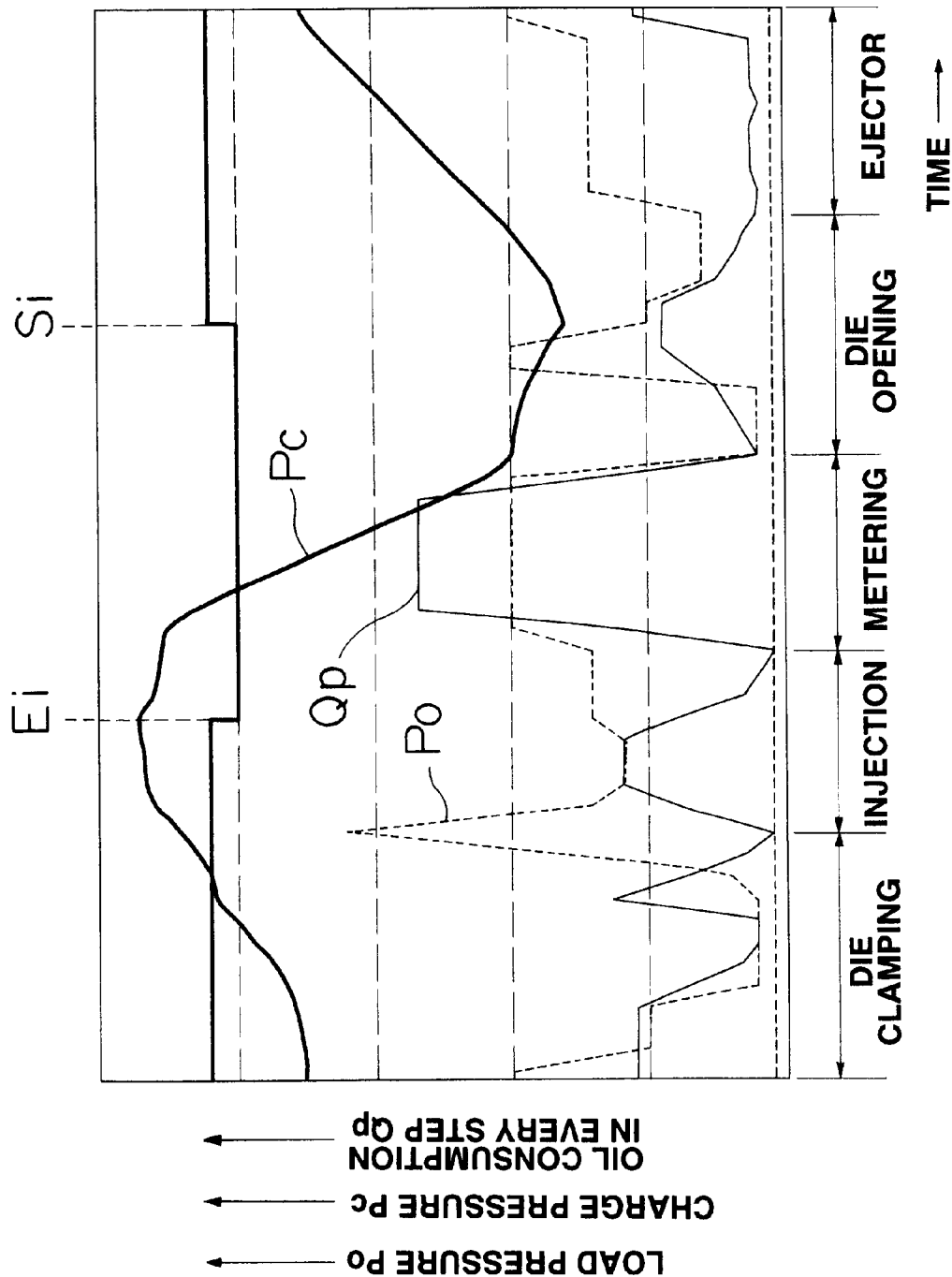
FIG. 2 is a characteristic diagram showing charge timing and physical quantities in a single molding cycle in the case of performing control in accordance with the accumulator control method.

Control is performed during molding such that the charge start point Si and the charge end point Ei are synchronized with each molding cycle as shown in FIG. 1. In this case, based on an input sequence operation signal (molding step signal), the arithmetic operation unit 26 operates the control valve 21 so as to control the charge start timing and charge end timing.

When the accumulator 2 is charged, the charge pressure is monitored from the beginning of the charge by means of the pressure sensor 22 so as to charge the accumulator 2 at the charge pressure Pc determined in the above learning mode.

Accordingly, since the charge start point Si and the charge end point Ei are synchronized with each molding cycle, the charge pressure Pc becomes constant (stable) in the steps of molding among the molding cycles, thereby improving molding quality. Further, since the charge pressure Pc at the charge start point Si is set at the sum of the maximum load pressure Pop as observed in a single molding cycle and the differential pressure Pd of the servo valve 4, wasteful accumulation of energy is prevented, and energy economy and economical efficiency are improved.

The present invention is not limited to the above-described embodiment. Regarding structural details, approaches, and the like, modifications and any omission or addition may be possible as needed without departing from the scope of the invention.

For example, the above embodiment is described while the charge start point and the charge end point are set for each of molding cycles. However, these points may be set for each of step divisions constituting a single molding cycle. In this case, a step division refers to each of two, three, or more divisions constituting a single molding cycle. A single molding cycle may be divided in various ways. For example, a single molding cycle may be divided according to the steps of molding, such as the injection step, the die clamping step, and the like. Alternatively, the injection step may be divided into a plurality of divisions. Further, alternatively, the die clamping step may be divided into a high-speed die clamping division requiring a high flow rate of hydraulic oil and a low-speed die clamping division for which a low flow rate of hydraulic oil will suffice. Also, the charge start point and the charge end point may be set according to a method other than that employed in the above embodiment.

What is claimed is:

1. An accumulator control method for controlling an accumulator connected to an oil hydraulic circuit of an injection molding machine, comprising the steps of:

performing an automatic learning mode, which operates the injection molding machine, for determining a charge start point and a charge end point;

setting said charge start point and said charge end point for the accumulator for each of molding cycles or for each of step divisions constituting a single molding cycle based upon said automatic learning mode; and performing control during molding such that said charge start point and said charge end point are synchronized with each molding cycle or for each step division.

2. An accumulator control method for an injection molding machine according to claim 1, wherein the step of performing includes operating the injection molding machine under an automatic operation in advance in such a manner that charging the accumulator starts when a predetermined lower limit is reached and that charging the accumulator ends when a predetermined upper limit is reach, and a physical quantity is measured and/or calculated in the automatic operation in order to obtain said charge start point and said charge end point.

3. An accumulator control method for an injection molding machine according to claim 1, wherein said charge end point is set at a point of time before a maximum load pressure occurs.

4. An accumulator control method for an injection molding machine according to claim 1, wherein said charge start point is determined based on the charge characteristic of the accumulator and a total oil quantity required for a single molding cycle starting from said charge end point or required for each of the step divisions starting from said charge end point.

5. An accumulator control method for an injection molding machine according to claim 2, wherein said charge start point is determined based on the charge characteristic of the accumulator and a total oil quantity required for a single molding cycle starting from said charge end point or required for each of the step divisions starting from said charge end point.

6. An accumulator control method for an injection molding machine according to claim 1, wherein a charge pressure at said charge start point is set at the sum of a maximum load pressure as observed in a single molding cycle or in each of the step divisions and a differential pressure of a servo valve connected to the actuator.

* * * * *